No. 784,848. PATENTED MAR. 14, 1905.
G. A. FÜLLIPP.
PIPE COUPLING.
APPLICATION FILED DEC. 9, 1904.
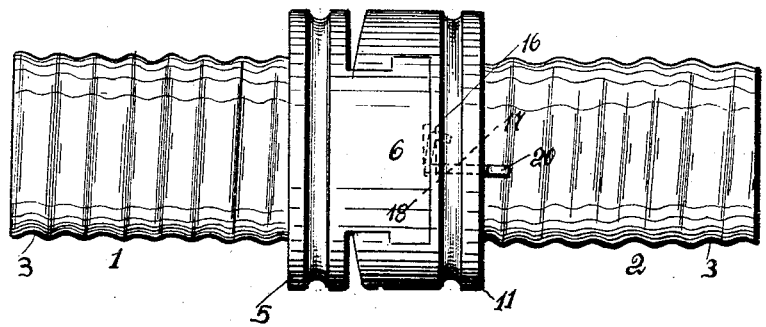
Fig. 1.
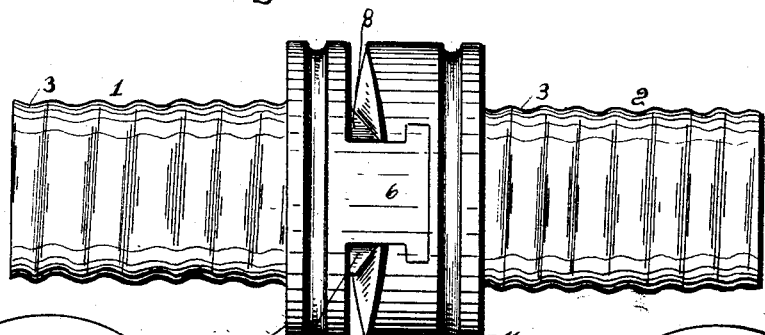
Fig. 2.
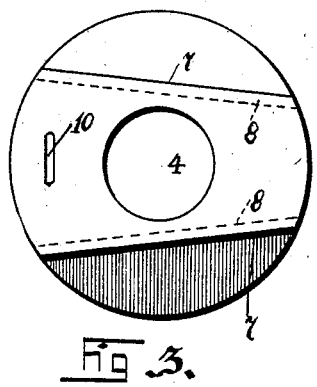
Fig. 3.
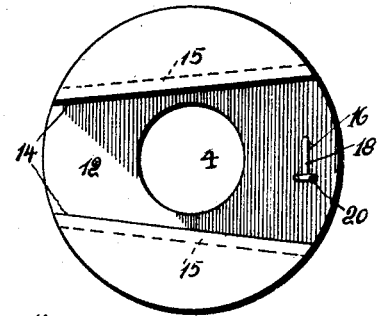
Fig. 4.
Fig. 5.
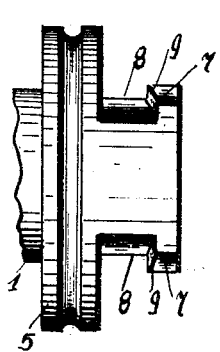
Fig. 6.
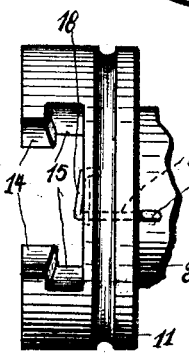
Fig. 7.
Witnesses:
Inventor.
George A. Füllipp.
by N. Evert &Co.
Attorneys.

No. 784,848.                                                    Patented March 14, 1905.

UNITED STATES PATENT OFFICE.

GEORGE A. FÜLLIPP, OF EAST McKEESPORT, PENNSYLVANIA.

PIPE-COUPLING.

SPECIFICATION forming part of Letters Patent No. 784,848, dated March 14, 1905.

Application filed December 9, 1904. Serial No. 236,215.

*To all whom it may concern:*

Be it known that I, GEORGE A. FÜLLIPP, a citizen of the United States of America, residing at East McKeesport, in the county of Allegheny and State of Pennsylvania, have invented certain new and useful Improvements in Pipe-Couplings, of which the following is a specification, reference being had therein to the accompanying drawings.

This invention relates to certain new and useful improvements in pipe-couplings, and has for its object the provision of novel means whereby two sections of pipe may be quickly and firmly secured together, providing a non-leakable connection between the two sections of pipe.

Another object of this invention is to dispense with the use of screw-threads and nuts, which have been commonly employed for connecting two sections of pipe together.

A further object of this invention is to provide novel means to lock two sections of pipe together when they have been placed in close proximity to one another.

The pipe-coupling as constructed by me is extremely simple in construction, strong and durable, and is constructed upon such lines that the changes in the temperature of the atmosphere surrounding the same, which causes an expansion and contraction of the metal, will not interfere with the general operation and service of the pipe-coupling.

With the above and other objects in view reference will be had to the drawings accompanying this application, wherein like numerals of reference designate corresponding parts throughout the several views, in which—

Figure 1 is a top plan view of my improved coupling. Fig. 2 is a bottom plan view. Fig. 3 is an end view of one of the sections of my improved coupling. Fig. 4 is an end view of the adjoining sections of my improved coupling. Fig. 5 is a detail perspective view of a spring-lock used in connection with my improved coupling. Fig. 6 is a bottom plan view of the section of pipe illustrated in Fig. 3 of the drawings, and Fig. 7 is a top plan view of the section of pipe illustrated in Fig. 4 of the drawings.

To put my invention into practice, I employ two sections of pipe 1 and 2, and the section 1 will be hereinafter termed the "male" member of the coupling and the section 2 the "female" member. These members are spirally grooved or corrugated, as indicated at 3, whereby sections of pipe or hose may be secured to said members. Each member is formed longitudinally of its length with a bore 4, and when said members are placed together these bores are adapted to aline with one another, whereby a complete passage will be formed through said members.

The male member 1 carries an enlarged head 5, which is preferably annular in form. The head carries a tapering locking-piece 6, which extends outwardly from the head 5. This tapering piece has its sides 7 grooved, as indicated at 8, said grooves extending vertically of said tapering piece, and the grooves are preferably wedge shape or tapering, as indicated at 9. In constructing the tapering piece 6 I preferably make the larger end of the tapering groove 8 at the smallest end of the tapering piece 6, the object of which will be hereinafter more fully described. The face of the tapering piece 6 is provided with a transversely-disposed slot 10.

The female member 2 is provided with an enlarged annular head 11, and this head is formed with a tapering recess 12. The sides 14 14 of said recess are provided with tapering grooves 15 15, and I preferably form the largest end of these tapering grooves at the largest end of the tapering recess 12.

The face of the head 11 is provided with a transversely-disposed slot 16, with which communicates an aperture 17, that extends outwardly in the rear of the head 11. In this slot 16 and the aperture 17 I mount an angular locking-spring 18, the one end 19 of which is secured in the top of the transversely-disposed slot 16, while the shank portion of said locking-spring extends out of the aperture and is provided with a "loop" handle 20, whereby the same may be easily gripped when it is desired to operate the same.

The manner of securing the two members together is as follows: The male member 1 is adapted to be placed above the member 2 and the tapering end of the piece 6 is moved downwardly into the tapering recess 12 of the member 2. The member 1 will travel within the member 2 until the tapering sides 7 have impinged within the tapering slots 15 of the member 2 and the tapering sides 14 of the member 2 have become wedged or impinged within the tapering grooves 8 of the member 1. When the members have been placed one within the other, the spring-lock 18, carried by the head 11, will engage in the transversely-disposed slot 10 of the tapering piece 6 and the head 5 will be firmly locked within the head 11. To uncouple the members, the handle 20 is gripped and the spring-lock pulled rearwardly, which will disengage the angular portion of said lock from the slot 10 and the tapering piece 6 can be raised out of the head 11. It will be observed that when the two members are locked one within the other the bore 4 of each member alines and a clear passage is provided through the coupled members.

While I have herein shown only one locking-spring to secure the members in a coupled position, it is obvious that a plurality of these locking-springs may be used and that various changes, such as the shape of the wedge-shaped locking-heads and their tapering faces, may be made without departing from the general spirit and scope of the invention.

What I claim, and desire to secure by Letters Patent, is—

1. A pipe-coupling comprising two members each having an enlarged head, the head of one member carrying an outwardly-extending locking-piece with tapering sides, said sides being grooved and the grooves having their enlarged end at the smallest end of said tapering piece, the other member being formed with a tapering recess adapted to receive said tapering piece and the sides of said recess being formed with tapering grooves.

2. A pipe-coupling comprising two members having enlarged heads, a tapering piece carried by one of said heads, said piece having tapering grooves formed therein, the opposing head having a wedge-shaped recess formed therein, the sides of said recess having tapering grooves formed therein, said recess and said grooves adapted to receive said tapering piece, one of said heads having a transversely-disposed groove formed therein, a transversely-disposed spring-lock carried by the opposing head and adapted to engage in said transversely-disposed groove, said members having bores formed therein, substantially as described.

In testimony whereof I affix my signature in the presence of two witnesses.

GEORGE A. FÜLLIPP.

Witnesses:
E. E. POTTER,
H. C. EVERT.